United States Patent
DeLuca et al.

(10) Patent No.: US 9,858,352 B2
(45) Date of Patent: *Jan. 2, 2018

(54) BROWSER BOOKMARKING FOR MULTIPLE ENVIRONMENTS

(71) Applicant: International Business Machines Corporation, Armonk, NY (US)

(72) Inventors: Lisa Seacat DeLuca, Baltimore, MD (US); Geetika T. Lakshmanan, Winchester, MA (US); Dana L. Price, Surf City, NC (US); Shelbee D. Smith-Eigenbrode, Thornton, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/218,100

(22) Filed: Jul. 25, 2016

(65) Prior Publication Data

US 2017/0147700 A1    May 25, 2017

Related U.S. Application Data

(63) Continuation of application No. 15/062,264, filed on Mar. 7, 2016, now Pat. No. 9,459,769, which is a (Continued)

(51) Int. Cl.
*G06F 3/0482* (2013.01)
*G06F 17/30* (2006.01)
(Continued)

(52) U.S. Cl.
CPC .... *G06F 17/30884* (2013.01); *G06F 3/04842* (2013.01); *G06F 17/2235* (2013.01)

(58) Field of Classification Search
CPC .................................................... G06F 3/0482
See application file for complete search history.

(56) References Cited

U.S. PATENT DOCUMENTS

| 8,850,383 B2 | 9/2014 | Adams et al. |
| 2002/0156832 A1 | 10/2002 | Duri et al. |

(Continued)

FOREIGN PATENT DOCUMENTS

| CN | 103383696 A | 11/2013 |
| WO | 2013166998 A1 | 11/2013 |

OTHER PUBLICATIONS

List of IBM Patents or Patent Applications Treated as Related, Appendix P, Filed Herewith, 2 pages.
(Continued)

*Primary Examiner* — Stephen Hong
*Assistant Examiner* — Sanchita Roy
(74) *Attorney, Agent, or Firm* — Daniel R. Simek

(57) ABSTRACT

Input is received to store information to access content displayed within a browser as a bookmark. A bookmark properties form is generated to include fields in which environments are identified as corresponding to the bookmark. Input is received that includes a first URL corresponding to the label of a first bookmark within a first environment. The bookmark is stored by including in the properties form, a label of the bookmark, the first environment corresponding to the bookmark, and the first URL corresponding to the first environment. A second URL is received that corresponds to the label of the first bookmark, but within a second environment, and includes the second environment in the properties form as corresponding to the label of the bookmark, and includes the second URL in the properties form as corresponding to the second environment, wherein the first URL differs from the second URL.

1 Claim, 5 Drawing Sheets

Related U.S. Application Data continuation of application No. 14/951,811, filed on Nov. 25, 2015.

(51) Int. Cl.
    *G06F 17/22*     (2006.01)
    *G06F 3/0484*     (2013.01)

(56) References Cited

U.S. PATENT DOCUMENTS

| | | |
|---|---|---|
| 2008/0172399 A1 | 7/2008 | Chi et al. |
| 2011/0302576 A1 | 12/2011 | Shen et al. |
| 2013/0061159 A1 | 3/2013 | Tseng et al. |
| 2013/0311869 A1 | 11/2013 | Jang |
| 2014/0245257 A1 | 8/2014 | Kusmer et al. |
| 2016/0085875 A1 | 3/2016 | Li |

OTHER PUBLICATIONS

DeLuca, et al., U.S. Appl. No. 15/062,264, filed Mar. 7, 2016.
DeLuca, et al., U.S. Appl. No. 15/412,078, filed Jan. 23, 2017.
DeLuca, et al., U.S. Appl. No. 14/951,811, filed Nov. 25, 2015.
"Intelligent placement of downloads or bookmarks", an Ip.com Prior Art Database Technical Disclosure, Disclosed Anonymously, Ip.com No. IPCOM000235588D, 2014-Mar-10, 2 pp., <http://priorart.ip.com/IPCOM/000235588>.

BROWSER BOOKMARKING FOR MULTIPLE ENVIRONMENTS

FIELD OF THE INVENTION

The present invention relates generally to the field of browser application bookmarking, and more particularly to organizing bookmark links across multiple environments.

BACKGROUND OF THE INVENTION

Content available on the World Wide Web offers an enormous amount of information and reference that users may find valuable. Once located, a common concern associated with information of value or interest is how to easily re-locate the information at a later time. Most individuals use browsers to search for content on the World Wide Web, and browsers often include a bookmark feature, which creates and saves a label associated with a uniform resource locator (URL) of the content. A URL has a protocol identifier (e.g. "http"), a resource name, sometimes referred to as a domain of the URL (e.g. www.example.com), and a context root, which includes the remaining characters of the URL excluding the domain, or resource name (e.g. /myfolder/myfile.pdf).

Browser users tend to "over bookmark", generating large lists of brief labels of content, which are often poorly organized, if at all. Over bookmarking makes it very difficult for a user to re-locate content previously found and saved. Many modern browsers, such as Google Chrome (Chrome is a registered trademark of Google Inc.) in the U.S. and may be subject to trademark rights in various jurisdictions throughout the world and are used here only in reference to the products or services properly denominated by the marks to the extent that such trademark rights may exist), include type-ahead techniques that facilitate users in locating content and provide an impression to users that not all content of value or interest needs to be bookmarked. However, the type-ahead-URL-entry mechanism does assume that users know all or part of a URL they wish to access, and therefore does not entirely replace a need for bookmarking.

Another related bookmarking issue exists among developers. While developing an application, activity typically shifts among multiple contexts, or environments. An environment for software development activity includes one or more computing systems on which a software application, or an application component, is written, updated, compiled, edited, unit tested, integration tested, debugged, usability tested, staged, and launched for production use. Some or all of such activities may be performed within a different context, or environment.

An integrated development environment (IDE) is a software application that includes access to comprehensive tools and resources for software development. For example, an integrated development environment may include, or provide access to a code editor, build automation, a compiler, a debugger, a built-in web browser, as well as other tools and features, and a graphical user interface enabling access and use of the resources of the environment.

Test environments may include local unit testing, integration testing in which multiple "units" of developed code are integrated and tested for function and interoperability, usability testing of graphical user interfaces, and performance of specific test cases. Staging is a pre-production environment for final testing prior to deploying to production and may be constructed to duplicate the computing system components and conditions that the application may encounter when launched in a production environment. Staging environments are often used to test performance and capacity of the application, as well as testing all installation, configuration, and migration procedures and scripts, used to enable the installation of the software application.

A production environment includes the computing systems and support in which the new software application or version release is made available to general user access, or the environment in which the software application is "launched". For example, a series of environments used by software/web application developers may include a local test environment, a team test environment, a staging environment, and a production environment.

Software development-related environments are only one example of multiple environments users may encounter. Other examples in which users may experience multiple environments may include simultaneously operating different versions or editions of the same program, educational references for various levels of instructions, such as elementary, middle school, and high school levels, multiple tenants of a service providers hosting services for multiple distinct businesses, business applications hosted in different locations, and web content and services associated with enterprise businesses. In some enterprise businesses, an organization might support an internal zone for employees of the enterprise business, and also support an external zone for clients, partners, and other associates. Each zone is an environment, and currently, separate bookmarks may be established by users of content or service of each environment.

SUMMARY

Embodiments of the present invention disclose a computer program product for organizing bookmarks of a browser, based on an environment in which the bookmarks are used, and provides for one or more computer readable storage media, and program instructions stored on the one or more computer readable storage media. The program instructions include program instructions to determine a first request to save content displayed within a browser as a bookmark associated with a label of a first bookmark. Program instructions to generate a properties form for the label of the first bookmark, such that the properties form includes a bookmark label field, and one or more environment fields, each of the one or more environment fields accepting an entry of a uniform resource locator. Program instructions to determine from the first request for a bookmark associated with the label of the first bookmark, a first uniform resource locator associated with a first environment, both of which are associated with the label of the first bookmark. Program instructions to add the label of the first bookmark to the bookmark label field and adding the first uniform resource locator to a first environment field of the one or more environment fields of the properties form. Program instructions to determine a second request to save content displayed within a browser as a bookmark associated with the label of the first bookmark, including a second uniform resource locator associated with a second environment, both of which are associated with the label of the first bookmark. Program instructions to add the second uniform resource locator to the second environment field of the one or more environment fields of the properties form, associated with the label of the first bookmark, such that the first uniform resource locator is distinct from the second uniform resource locator. Program instructions to store information to access content associated with the label of the first bookmark in the properties form the first uniform resource locator that is used to access content associated with the label of the first bookmark from the first environment, and the second uniform resource locator that is used to access content associated with the label of the first bookmark from the second environment, such that the first uniform resource locator associated with the first environment and the second uniform resource locator associated with the second environment, each includes a context root, in which the first uniform resource locator and the second uniform resource locator include a distinct domain concatenated with a same context root for both the first uniform resource locator and the second uniform resource locator. In response to receiving a request to select a bookmark, program instructions to dynamically determine an environment corresponding to a domain of an active web page of a browser, and present a set of labels of bookmarks that are associated with the environment corresponding to the domain of the active web page of the browser, and in response to program instructions determining a change from the first environment to the second environment, based on detecting a change of a domain of the active web page of the browser, in which the change of the domain of the active web page of the browser corresponds to the second environment, program instructions to generate a second set of uniform resource locators automatically, based on concatenating the domain of the second environment and at least one context root of at least one uniform resource locator of the first set of uniform resource locators, such that the second set of uniform resource locators are associated with the second environment.

DETAILED DESCRIPTION

Embodiments of the present invention recognize that browser bookmark management may be complicated by users performing web-based activities within multiple environments. Saving links of web-based content and resources for future easy-access may often result in multiple instances of a common bookmark having a uniform resource locator (URL) link that varies based on the environment of the user. Users having multiple instances of bookmarks for each of multiple resources or content, may experience significant difficulty in locating and navigating lists of bookmarks to correctly make a desired selection. Embodiments of the present invention provide a method, computer program product, and computer system for improving browser bookmarking under conditions of environment switching.

A common set of bookmarks, linking to a common set of content and/or resources, may reside across multiple contexts, or environments. For example, a developer that performs development and unit testing on code written on the developer's client machine may at some point move the code being developed into a test environment and may have need to access the same set of content and/or resource bookmarks (on a different server (domain)). The developer may then move the code into different zones, for example, the code may be installed in a cloud environment, and there may be a need to access some of the same bookmarks for the same resources, which are now hosted in a cloud zone. The developer may next move the code into a dev-ops environment, and again access the same resources that have different bookmarks within the current environment. Often the difference of a bookmark from one environment to another may be the address of the host of the environment. Embodiments of the present invention improve the structure and organization of the bookmarks that are used across the multiple environments.

In some embodiments of the present invention an "environment" attribute is added to a browser properties form for bookmarking a particular URL of content or resource on the World Wide Web. Multiple environments may each include an instance of a particular content or resource linked to by a bookmark, and an environment-specific URL is associated with the bookmark for each environment. In other embodiments of the present invention, the base URL and the context root of bookmark URLs linking to content or resources common to multiple environments are determined. The context root of the bookmarks is concatenated with each of the environment-specific base URLs (i.e. domain), to produce bookmark URLs associated with each of the multiple environments.

Figure 1:
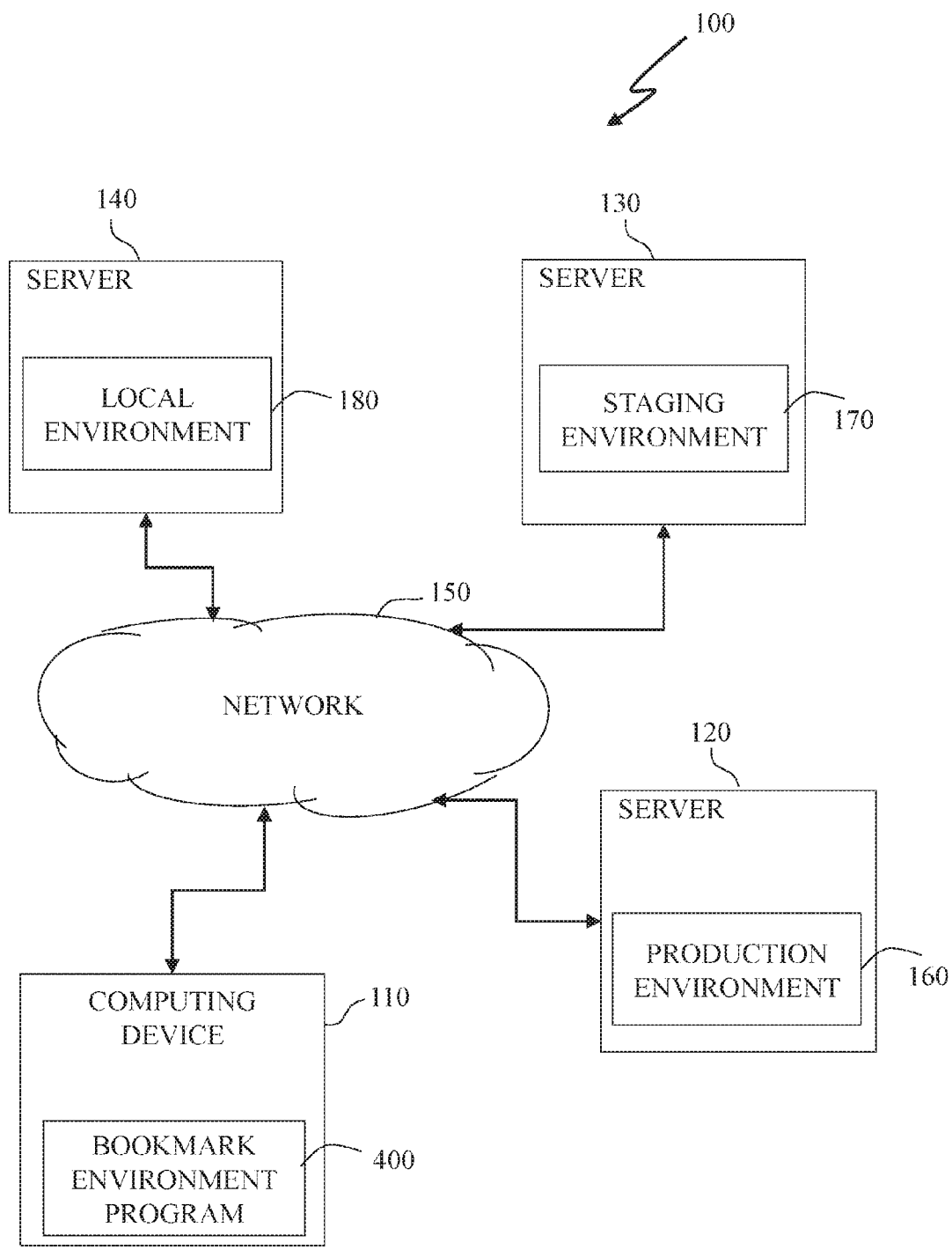
FIG. 1 is a functional block diagram illustrating a distributed computer processing environment, in accordance with an embodiment of the present invention.

The present invention will now be described in detail with reference to the Figures. FIG. 1 is a functional block diagram illustrating a distributed computer processing environment, generally designated 100, in accordance with an embodiment of the present invention. Distributed computer processing environment 100 includes computing device 110 depicted as hosting bookmark environment program 400, server 120 shown as hosting production environment 160, server 130 shown as hosting staging environment 170, and server 140 shown as hosting local environment 180, all interconnected via network 150.

Network 150 can be, for example, a local area network (LAN), a telecommunications network, a wide area network (WAN), such as the Internet, a virtual local area network (VLAN), or any combination that can include wired, wireless, or optical connections. In general, network 150 can be any combination of connections and protocols that will support communications between servers 120, 130, 140, computing device 110, and bookmark environment program 400, in accordance with embodiments of the present invention.

In some embodiments of the present invention, local environment 180, shown as hosted by server 140, is a local environment and may include an integrated development environment (IDE), which includes a set of applications, content, and resources enabling a user (e.g. a software developer) to develop, edit, and perform unit debug activity on software applications. From a perspective of bookmarks established in order to access URLs in a particular environment, such as local environment 180, the environment may be considered as a "context" of the particular bookmark. Hereafter, the term "environment" as applied to one or more bookmarks is used to refer to the "context" of the particular bookmark. A URL associated with a particular bookmark of a first environment, which links to a resource, differs in some part from a URL associated with a particular bookmark of a second environment, which links to another instance of a similar resource, usually by the designation of the server hosting the resource or content to which the bookmark links.

In some embodiments of the present invention, staging environment 170, shown as hosted on server 130, includes a set of applications, content, and resources enabling one or more users to perform various tests on software applications and application components, and enable performance of the software application to be assessed, and compatibility with hardware and other software applications to be determined. Some or all of the applications, content, and resources may be common to those of local environment 180 and are accessible by a user of computing device 110. The user may save links to the applications, content, and resources by creating bookmarks via a browser; however, staging environment 170 is a distinct and separate environment from local environment 180, and a URL to an application, content, or resource common to local environment 180 and staging environment 170, will differ.

In some embodiments of the present invention, production environment 160, shown as hosted on server 120, includes hardware, applications, and resources supporting the operation of the software application once the application has been "launched", in which case the software application is made generally available for access by its intended set of users. Production environment 160 is distinct and separate from staging environment 170 and local environment 180, and URLs to applications, tools, content, and resources will differ by some degree, from the URLs of applications, tools, content, and resources, common to local environment 180 and staging environment 170.

Computing device 110 is an end-user computing device configured to enable connection to multiple environments, including local environment 180 of server 140, staging environment 170 of server 130, and production environment 160 of server 120. In some embodiments computing device 110 may be a management server, a web server, a mobile computing device, or any other electronic device or computing system capable of receiving and sending data. In other embodiments, computing device 110 may represent a virtual computing device of a computing system utilizing multiple computers as a server system, such as in a cloud computing environment. In another embodiment, computing device 110 may be a laptop computer, a tablet computer, a netbook computer, a personal computer (PC), a desktop computer, a personal digital assistant (PDA), a smart phone, or any programmable electronic device capable of performing the operational steps of bookmark environment program 400, via network 150. In another embodiment, computing device 110 represents a computing system utilizing clustered computers and components (e.g., database server computers, application server computers, etc.) that act as a single pool of seamless resources when accessed within distributed computer processing environment 100. Computing device 110 may include internal and external hardware components, as depicted and described with reference to FIG. 5.

In some embodiments each or any of servers 120, 130, and 140, may be a management server, a web server, a mobile computing device, or any other electronic device or computing system capable of receiving and sending data. In other embodiments, servers 120, 130, and 140 may represent a virtual computing device of a computing system utilizing multiple computers as a server system, such as in a cloud computing environment. In another embodiment, servers 120, 130, and 140 may be a laptop computer, a tablet computer, a netbook computer, a personal computer (PC), a desktop computer, a personal digital assistant (PDA), a smart phone, or any programmable electronic device capable of hosting one or more of local environment 180, staging environment 170, and production environment 160, each of which is accessible via network 150. In another embodiment, servers 120, 130, and 140 represents a computing system utilizing clustered computers and components (e.g., database server computers, application server computers, etc.) that act as a single pool of seamless resources when accessed within distributed computer processing environment 100. Servers 120, 130, and 140 may include internal and external hardware components, as depicted and described with reference to FIG. 5.

Bookmark environment program 400, shown as hosted on computing device 110, enables browser bookmarks to be saved such that the URL of a bookmark is aligned with each environment in which the bookmark is accessible. In some embodiments of the present invention, bookmark environment program 400 is integrated with a browser application (not shown) operating on computing device 110. In other embodiments, bookmark environment program 400 works as a separate application working in conjunction with a browser application of computing device 110. For example, users in application development roles often access a common set of tools, content, and resources in various environments, and the URLs associated with each common item of the set differ by the environment in which it is accessed, but share a common portion of the URL, referred to herein as a context root. Bookmark environment program 400 enables bookmarking of links to the same or similar tools, content, applications, and resources to reflect multiple environments in which each bookmark is accessible.

Figure 2:
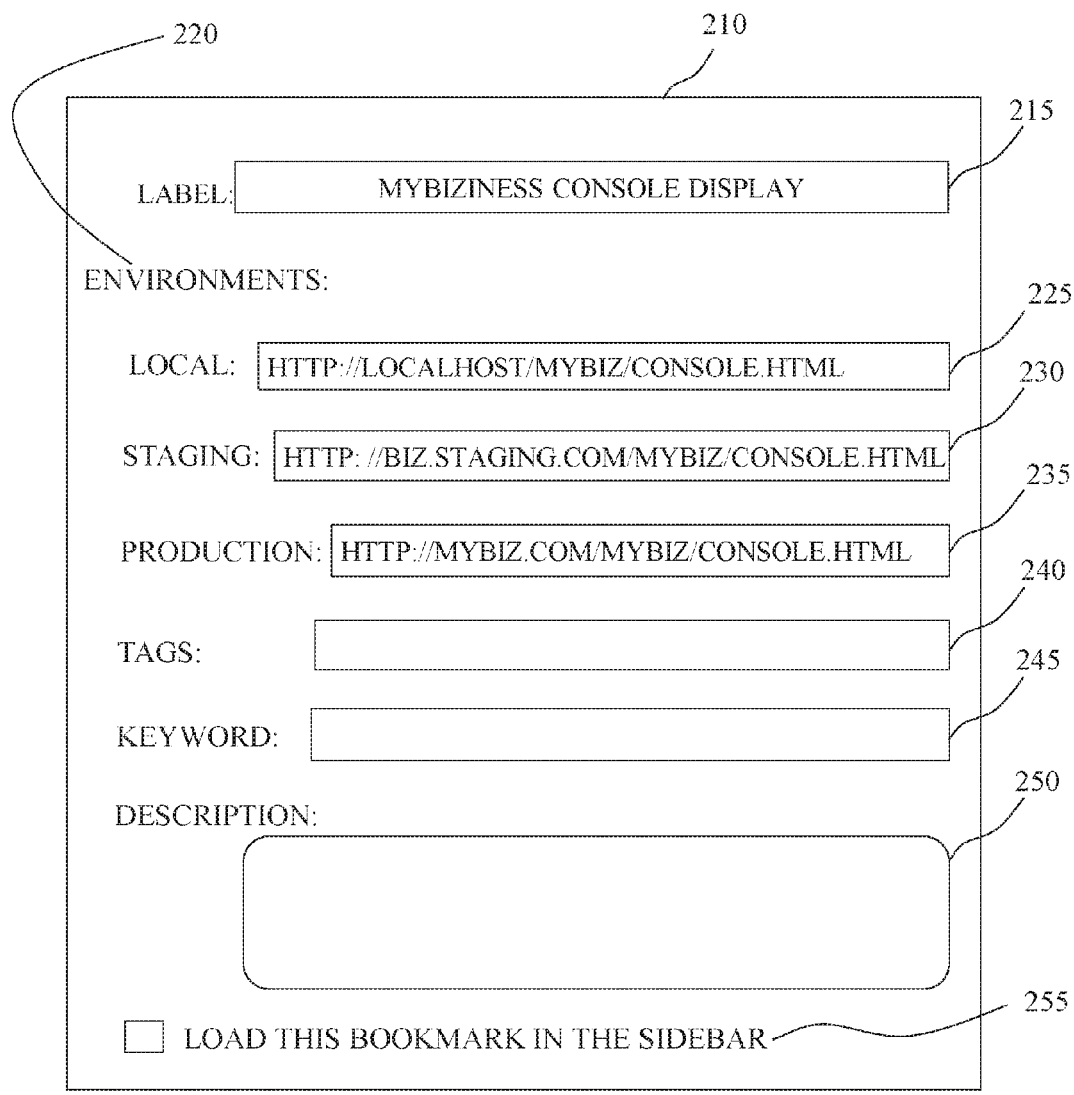
FIG. 2 is a block diagram illustrating an example of a browser bookmark properties form including multiple environments, in accordance with an embodiment of the present invention.

FIG. 2 is a block diagram illustrating an example of bookmark properties form 210, including a listing of multiple environments, in accordance with an embodiment of the present invention. Bookmark properties form 210 includes label field 215, environments 220, local field 225, staging field 230, production field 235, tags field 240, keyword field 245, description field 250, and sidebar load indicator 255.

Bookmark properties form 210 is an example browser bookmark properties form, modified by bookmark environment program 400, for input of bookmark-related data, including a label to associate with the content linked to by the bookmark, which is input into label field 215. In some embodiments of the present invention, a default label may be determined by the browser, based on the content to which the bookmark links. In other embodiments the label associated with the bookmark link may be entered into label field 215 by the user. In some embodiments of the present invention, a section of bookmark properties form 210 includes environments 220, which lists one or more fields that each represent a separate environment. In the example of bookmark properties form 210 environments 220 shows three separate environment fields that include local field 225, staging field 230, and production field 235. For completeness, bookmark properties form 210 includes tags field 240, and keyword field 245, used for search enablement and efficiency, description field 250 for brief reference describing the content bookmarked, and sidebar load indicator 255, for user selection to display the bookmark in a sidebar location of the browser.

The fields of environments 220 hold URLs of content that are hosted and/or supported within different contexts, such that each context corresponds to a different environment. Environments 220 of bookmark properties form 210 includes a local environment, which in some embodiments of the present invention, may be the local computing device to which a user, such as an application developer, submits input and from which the developer receives output. Local field 225 holds a URL for a bookmark of content accessible within the local environment. Environments 220 also includes a staging environment, which hosts applications being developed and enables various testing and performance assessments of the application, and may serve to represent the hardware and other conditions of a production environment to which the application will be deployed when testing is complete, and customer acceptance is received. Staging field 230 holds a URL for a bookmark of content accessible within the staging environment. The third environment shown in the example of bookmark properties form 210 is a production environment, which has a corresponding URL that is held in production field 235, and which links to content accessible within the production environment.

In some embodiments of the present invention, populating each environment field with a URL that corresponds to the respective environment, and associating all environment field URLs with the bookmark label entered in label field 215, enables a user, such as an application developer, to organize a bookmark link to content in multiple environments, under one associated label. In some embodiments, selecting the bookmark label of label field 215, "mybizness console display", produces a listing of environment choices from which a user may select a particular environment in which the user is currently engaged. The listing of selectable environments will be discussed further below in regards to FIG. 3B. Each of the URLs of included in local field 225, staging field 230 and production field 235 of environments 220, links to similar content, but not necessarily identical content, hosted within a separate environment of hardware, software, and network connections. For example, a bookmark for "support contacts", most likely will be different for different environments. Thus, the particular URL associated with the bookmark for each of multiple environments will correspondingly be different for each of the multiple environments. Embodiments of the present invention provide structured organization to saved bookmarks, improved selection efficiency, preserved environment differences, and reduction of redundancy in bookmark listings.

For example, a developer, working on a local computing device, bookmarks a link to a development console application that is located on the local computing device at URL: "http://localhost/mybiz/content.html". The developer enters the URL link in local field 225 of environments 220 as part of bookmark properties form 210 that was displayed when the developer selected to bookmark the link, and provides a label for the bookmarked link, "mybizness console display" in label field 215, (or the user selected URL link is entered by the browser into local field 225 of bookmark properties form 210). In addition, the developer enters a URL into staging field 230 and production field 235, but each URL differs by the URL base, such as "http://biz.staging.com", for staging field 230, and "http://mybiz.com", for production field 235, with the context core of "mybiz/console.html" remaining constant for all URLs associated with the bookmark label "mybizness console display", entered in label field 215.

The URL link entered for each environment of bookmark properties form 210 connects to a representation of the "mybizness" console display in that particular environment, however, a selection of environment determines which of those URLs is accessed. In some embodiments of the present invention, selection of a saved bookmark includes selection of an environment corresponding to a particular instance of the bookmark content, such as selecting the staging environment, which accesses the instance of the console application at URL "http://biz.staging.com/mybiz/console.html". In other embodiments, the environment in which a user is active is detected and the detected environment is selected by default, notwithstanding manual intervention by the user.

Figure 3A:
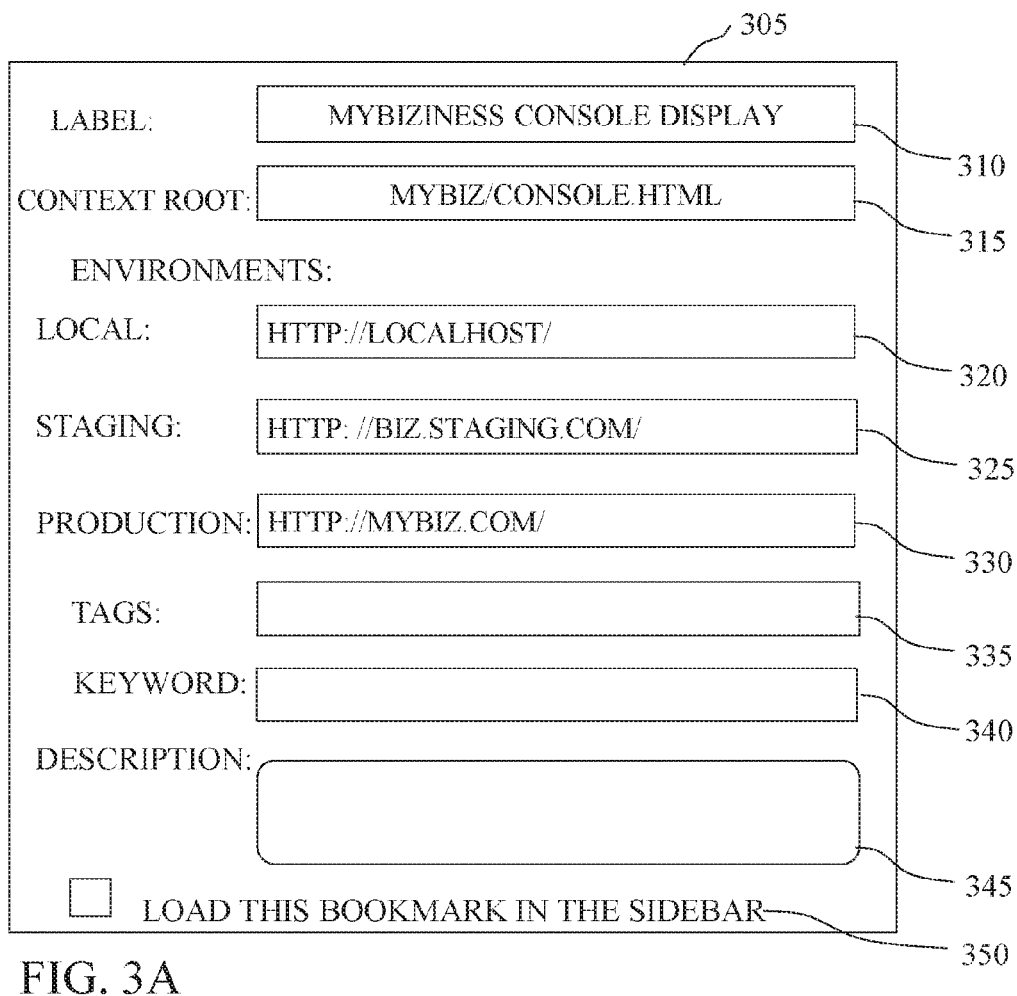
FIG. 3A is a block diagram illustrating an example of a browser bookmark properties form including a context root field and multiple environments, in accordance with an embodiment of the present invention.

FIG. 3A is a block diagram illustrating an example of bookmark properties form 305, supporting bookmarks that differ only by context root. Bookmark properties form 305 includes a context root field and multiple environments, in accordance with an embodiment of the present invention. Bookmark properties form 305 depicts data entry fields similar to those discussed in regards to bookmark properties form 210 of FIG. 2; however, bookmark properties form 305 includes context root field 315, and local field 320, staging field 325, and production field 330 are populated with only a base URL corresponding to the respective environment. For completeness of the example form, bookmark properties form 305 includes tags field 335, and keyword field 340, used for search enablement and efficiency, description field 345 for brief reference describing the content bookmarked, and sidebar load indicator 350, for user selection to display the bookmark in a sidebar location of the browser.

Context root field 315 is shown in FIG. 3A as including a URL root of "mybiz/console.html", and local field 320 is shown with a base URL of "http://localhost/", staging field 325 is shown with a base URL of "http://biz.staging.com/", and production field 330 is shown as including a base URL of "http://mybiz.com/". In some embodiments of the present invention, a user has determined and made entries that include the base URLs for each of a local, staging, and production environment. Upon indication of bookmarking a selection of content, such as an application "console.html", located in a folder labelled "mybiz", the context root of the URL associated with the bookmark target, is added to context root field 315, which in some embodiments is done automatically by determining the selected content and location, and in other embodiments, the context root may be entered manually. Upon subsequent selection by the user, of the bookmark "mybizness console display", included in label field 310 of bookmark properties form 305, the user is presented with a listing of environments in which access to "mybizness console display" is available. Selection of an environment concatenates the base URL (i.e. the domain) of the environment, such as "http://biz.staging.com/" for the staging environment, with the context root "mybiz/console.html", to complete the URL and access the selected bookmark content within the selected environment, without duplicate listings of URLs for the user to decipher and choose from.

In some embodiments of the present invention, the URL of a bookmark within a new environment may be dynamically generated (by bookmark environment program 400, discussed below). The dynamic generation of the bookmark may use the active web page of a browser, which is a web page within an open browser in which the cursor is active and responds to keyboard or pointing device activity. The bookmark may be dynamically generated by determining the current environment of an active web page in which a user is operating, and concatenating the context root of the bookmark for a previously saved environment with the base URL or domain of the current environment (i.e. appending the context root to the domain), and adding the generated URL to a field within the modified browser properties form for the bookmark.

Figure 3B:
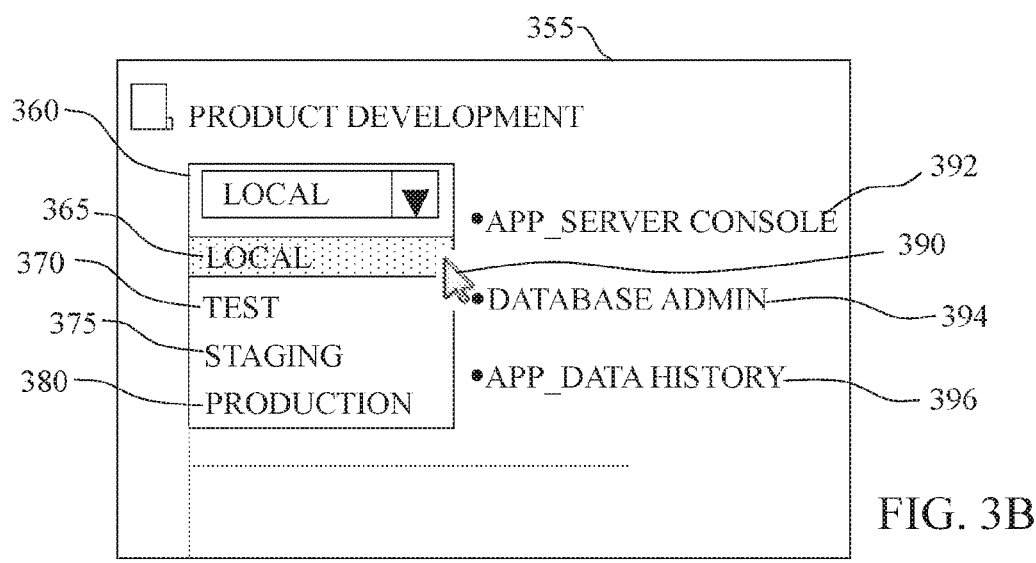
FIG. 3B is a block diagram illustrating an example of an environment selection menu associated with a selected bookmark of content displayed by a web browser, in accordance with an embodiment of the present invention.

FIG. 3B is a block diagram illustrating an example of environment selection menu 355 associated with a selected bookmark of content displayed by a web browser, in accordance with an embodiment of the present invention. Environment selection menu 355 corresponds to a bookmark folder labelled "product development" and includes drop-down list 360, which further includes local environment selection 365, test environment selection 370, staging environment selection 375, and production environment selection 380. Environment selection menu 355 also includes links to content having the labels: app_server console 392, database admin 394, and app_data history 396.

Drop-down list 360 includes a listing of various environments in which instances of content, applications, and/or tools may be accessed by the links of the "product development" bookmark folder as displayed in environment selection menu 355. In some environments of the present invention, local environment selection 365 is a local computing system comprised of one or more computing devices, system components, and network access, used by a developer for application development activity, or by a other users for various activities, such as system administrative support. Test environment selection 370 may include one or more systems that may be used for loading one or more software application modules and testing module function, interaction, and integration. Staging environment selection 375 may include one or more systems that may be used for testing the operational performance of a developed application, as well as compatibility of the application function with the hardware and other software components of the staging environment, which is often constructed to replicate the production environment selection 380 structure and conditions, prior to releasing the developed application to "go live". Production environment selection 380 may include one or more systems in which a developed software application is hosted and released as generally available for approved users.

In some embodiments of the present invention, the app_server console 392, database admin 394, and app_data history 396 links of FIG. 3B are previously saved bookmarks and are accessible in multiple environments as depicted by drop down list 360, that includes local environment selection 365, test environment selection 370, staging environment selection 375, and production environment selection 380. A user, such as a product developer, selecting the "product development" bookmark folder, corresponding to the development environment, is presented with drop down list 360, which includes labels corresponding to the environments in which the links of app_server console 392, database admin 394, and app_data history 396, are available. The user selects an environment from drop down list 360, such as local environment selection 365, as depicted by the position of cursor 390. After selecting local environment selection 365, the user is able to select a link from app_server console 392, database admin 394, and app_data history 396, which are presented as a listing of links included in the "product development" bookmark folder, and the selected link of the selected environment, opens in a browser window of the user's computing device.

In some embodiments, bookmark environment program 400 determines the current environment as the default environment, which the user may override. If the user switches environments, bookmark environment program 400 determines the new environment as the default environment for bookmark link selections. In other embodiments, an environment is selected by a user designating the environment in which a bookmark link is to be selected. In some embodiments of the present invention, in which only the context root of the URLs vary, by selecting an environment from drop-down list 360 a URL base is defined. By subsequently selecting a bookmark item, for example, database admin 394, the context root of the bookmark is selected and concatenated with the previously selected URL base to form a complete URL link, which accesses the content, application, or tool associated with the context root, from the selected environment associated with the URL base.

Figure 4:
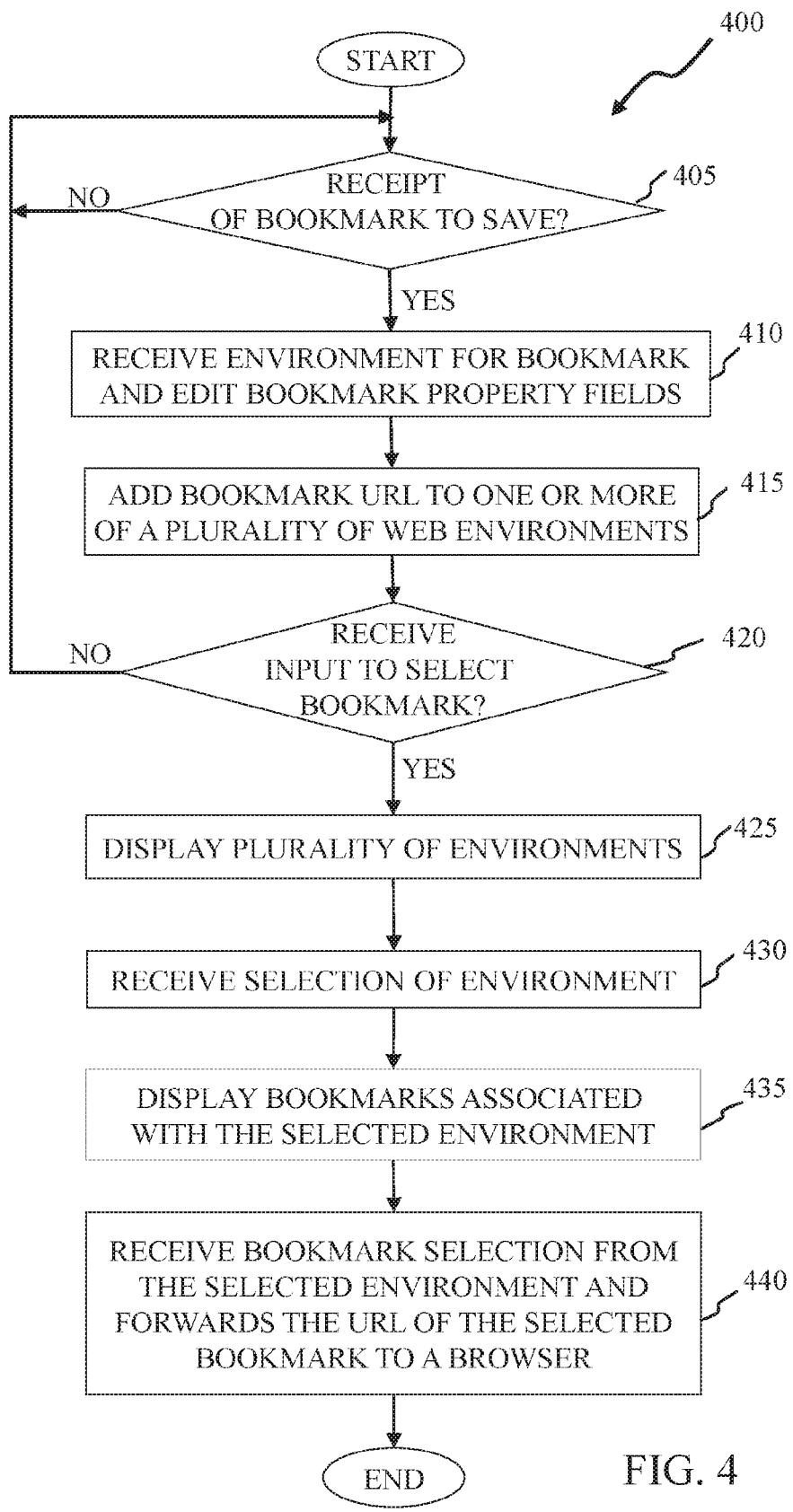
FIG. 4 depicts operational steps of a bookmark environment program, operating on a computing device within the distributed computer processing environment of FIG. 1, in accordance with an embodiment of the present invention.

FIG. 4 depicts operational steps of bookmark environment program 400, operating on a computing device within distributed computer processing environment 100 of FIG. 1, in accordance with an embodiment of the present invention. Bookmark environment program 400 continuously monitors for receipt of a bookmark to be saved (decision step 405). In some embodiments of the present invention, bookmark environment program 400 continuously "listens" for, or monitors input indicating a bookmark is to be saved. For example bookmark environment program 400 may perform a background loop checking for a browser selection to bookmark a link. For the case in which bookmark environment program 400 does not receive an indication that a bookmark is to be saved (step 405, "NO" branch), bookmark environment program 400 continues to monitor (listen) for bookmarks to be saved, looping to decision step 405. For the case in which bookmark environment program 400 receives input indicating a bookmark is to be saved (step 405, "YES" branch), bookmark environment program 400 receives input defining an environment for the bookmark, and bookmark environment program 400 edits the fields of a bookmark properties form (step 410), to include the environment.

As a user, such as an application developer, selects online content and resources to be bookmarked, bookmark environment program 400 receives input defining the environment of the bookmark from the user. In some embodiments of the present invention, the environments of the particular bookmarks are identified by input received by bookmark environment program 400 that is associated with the bookmark to be saved, which in some embodiments, is received from the user and applied to fields of a bookmark properties form, such as bookmark properties forms 210 or 305. The input includes the environment in which the bookmark is to be associated in a bookmark listing. For example, the environment for the bookmark may be a "local" environment, which may include the computing device on which the user is working and the local system components available to the user. In some embodiments, the input includes the complete URL for a bookmark to be associated with a particular environment, in another embodiment, the base URL is associated with the identified environment, and a context root of the URL is associated with the user-designated label for the particular bookmark. For example, for the fabricated URL: http://abcTesting.com/test01/application01/setup.txt, the base URL portion is, "http://abcTesting.com", and the context root is "/test01/application01/setup.txt".

In a further example, bookmark environment program 400 receives input designating a bookmark to be saved. Bookmark environment program 400 receives input for a bookmark properties form which associates the particular bookmark with a "local" environment and includes a full URL link to the target item within the local environment. Bookmark environment program 400 edits the bookmark properties form for the bookmark to include the designated local environment and associate the full URL with the user defined bookmark label (e.g. bookmark label 215, FIG. 2), for the local environment. In another embodiment, the input received for a bookmark is parsed by bookmark environment program 400 and the base URL, or domain, is associated with a user designated environment of "local" and the context root of the URL is associated with a user-designated label of the target item (e.g. context root field 315, and local field 320, FIG. 3A). Bookmark environment program 400 edits the properties form for the bookmark to reflect the particular bookmark URL of the targeted item as corresponding to the environment received as input.

Bookmark environment program 400 adds the received bookmark URL to one or more of a plurality of web environments (step 415). Having received the input designating the particular environment of the bookmark, and having received a URL link associated with the bookmark, bookmark environment program 400 adds the bookmark URL to a bookmark listing, and associates the bookmark with the designated environment. In some embodiments of the present invention, bookmark environment program 400 automatically determines the current environment, for example, by the domain of the URL, and associates the received bookmark with the current environment as a default. In other embodiments, bookmark environment program 400 associates the bookmark with the environment received by the user input to fields of a bookmark properties form of a browser.

For example, a user operating within a staging environment, provides input for a particular bookmark to be saved. Bookmark environment program 400 receives the input and adds the bookmark URL to a folder associated with the staging environment, which is designated or selected by the user, within a listing of bookmarks of the user's browser. The bookmark is saved and associated with the staging environment in which the user is working with the active browser window. In some embodiments of the present invention, a base URL of the bookmark is saved as an environment, and may be selected by the user to associate the root of subsequent bookmarks to the same environment. Multiple bookmarks may be received and result in establishing a plurality of environments, and as additional bookmarks are received, bookmark environment program 400 associates each bookmark with a new or existing corresponding environment (e.g. by user input or detection by bookmark environment program 400). Bookmarks of resources that are hosted in each of multiple environments are saved by bookmark environment program 400 by associating each bookmark instance with its corresponding environment. Users indicate a request to access a label of a saved bookmark and are presented with a listing of environments. The user accesses the label of the bookmark by selection of an environment by the user (or determined by bookmark environment program 400), followed by presentation of the bookmark labels (that correspond to URLs of the respective bookmarks) associated with the selected (or determined) environment, to the user. In this manner the user does not have to discern between labels or URLs of bookmarks for multiple environments.

Bookmark environment program 400 determines whether input to select a saved bookmark has been received (decision step 420), and in response to determining that input to select a saved bookmark has not been received (step 420, "NO" branch), bookmark environment program 400 returns to step 405 and proceeds to monitor (listen) for input of a request for a bookmark to be selected. For the case in which bookmark environment program 400 does receive input to select a saved bookmark (step 420, "YES" branch), bookmark environment program 400 displays a listing of a plurality of environments associated with saved bookmarks (step 425). Each bookmark, when saved, is associated with a particular environment. In some embodiments of the present invention, the selection of a URL linking to content or resources, to be saved as a bookmark, is accompanied by a bookmark properties form in which an environment is selected from previously defined environments, or a new environment is added. The bookmark to be saved is associated with the selected or added environment, and when user input is subsequently received to display bookmarks for selection, bookmark environment program 400 displays a listing of the plurality of environments.

Having displayed a plurality of environments from which a bookmark may be selected, bookmark environment program 400 receives input of a selection of an environment (step 430). Bookmark environment program 400 presents a display of environments from which a bookmark may be selected. The user selects an environment, generally by use of a pointing device, touch screen, or keyboard entry, and bookmark environment program 400 receives the selection of the environment. For example, having indicated a bookmark is to be selected, a user is presented with a list of environments that include, a local environment, a staging environment, and a production environment. The user is currently operating within the staging environment and therefore selects from the display, the staging environment, from which a bookmark is to be selected. Bookmark environment program 400 receives the input from the user selecting the staging environment. In another exemplary embodiment, bookmark environment program 400 determines that the user is operating within the staging environment and uses the determination as the input of the selected environment. In some embodiments, an option for manually changing the selection of environments may accompany a display of bookmarks resulting from automatic determination of the current environment of the user.

Bookmark environment program 400 receives the selection of an environment and displays the bookmarks associated with the selected environment (step 435). Each URL saved by bookmark environment program 400 is associated with an environment, in which the association aligns a particular instance of a bookmark with a particular environment. The association of bookmark to environment eliminates previously experienced redundancy within listings of bookmarks, and removes the need for users to recall or decipher the environment to which a particular bookmark is linked. In some embodiments of the present invention, the user is presented a list of only those bookmarks that are associated with the particular environment selected by the user, or automatically determined by bookmark environment program 400.

Bookmark environment program 400 receives the bookmark selection from the selected environment and forwards the URL of the selected bookmark to a browser (step 440). Having displayed the set of bookmarks that are associated with the selected (or determined) environment, bookmark environment program 400 receives the selection of the bookmark from a listing of the bookmarks of the selected environment, and forwards the URL of the bookmark to the user's web browser. Having completed receipt of the bookmark selection from the environment selected by the user, or determined by bookmark environment program 400, and having forwarded the URL of the selected bookmark to the user's browser, bookmark environment program 400 ends.

Embodiments of the present invention that are discussed include examples of application development environments for purposes of explanation and clarification, and are not intended to be limiting. Other logical groupings of content, tools, and resource may also benefit from embodiments of the present invention. One such area may be "devops environments" which may benefit from having a task-based grouping. For example, resources commonly used and bookmarked in a devops environment may include a baremetal provisioning url, a vm provisioning url, and an admin console url for each of three environments of development, test, and production. In this case it may make sense to customize the groupings of bookmarks as shown below in Table 1, instead of organizing them by environment.

MyProject DevOps:

TABLE 1 customized bookmark organization.

| Bare Metal Provisioning | VM Provisioning | Admin Console |
| --- | --- | --- |
| Development: | Development: | Development: |
| http://baremetal.order_dev/ | http://provisionvm_dev/ | http://admin_dev/ |
| development_template | development_template | development_template |
| Test: | Test: | Test: |
| http://baremetal.order_test/ | http://provisionvm_test/ | http://admin_test/ |
| test_template | test_template | test_template |
| Production: | Production: | Production: |
| http://baremetal_order_prod/ | http://provisionvm_prod/ | http://admin_prod/ |
| production_template | production_template | production_template |

Embodiments of the present invention may also be applied within an Integrated Development Environment (IDE), such that when a user switches the server on which they are deploying applications, the browser environment could also switch by automatically detecting the hosting server. In this manner, when a user accesses a link, for example a bookmark for "admin console", there is no need for the user to toggle a drop down box to select a new environment, such as a "local" environment, when the user is testing locally from within their IDE. In some embodiments of the present invention, the automatic determination of the environment in which a user is working, based on determining the hosting server(s), may be extendable to enable cloud technologies to automatically create a set of customized bookmarks, based on an existing bookmark list, as environments are created and/or provisioned in cloud hosting sources. In some embodiments, the techniques of automatically determining an environment of a user, and/or creating customized bookmarks based on a change of environments, may be included within a browser-based technology and reduce or eliminate a need for manually modifying bookmarks to align with working environments.

Some embodiments of the present invention include a user interface associated with one or more browsers that provide and enable a user to create, read, update, and delete, entries made to the browser properties form for bookmarks. The various entries of the browser properties form correspond to environments, labels of bookmarks, uniform resource locators associated with labels of bookmarks, and domains and context roots associated with uniform resource locators.

Figure 5:
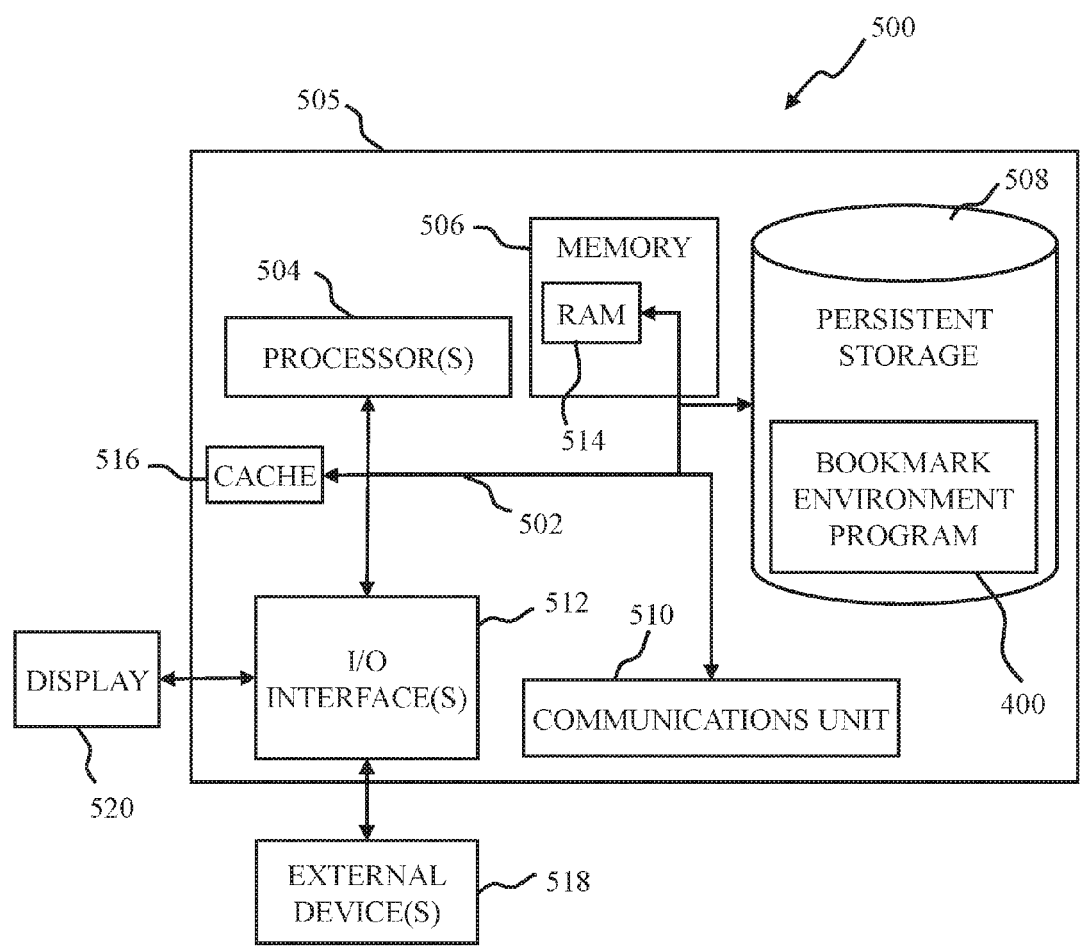
FIG. 5 depicts a computer system, including a computing device capable of operating the bookmark environment program of FIG. 4, in accordance with an embodiment of the present invention.

FIG. 5 depicts computer system 500, and includes computing device 505, which has similar components to computing device 110, and servers 120, 130, and 140, and has capability to operate bookmark environment program 400 of FIG. 4, similar to that of computing device 110, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing device 505 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506, cache memory 516, and persistent storage 508 are computer readable storage media. In this embodiment, memory 506 includes random access memory (RAM) 514. In general, memory 506 can include any suitable volatile or non-volatile computer readable storage media.

In some embodiments of the present invention, bookmark environment program 400 is stored in persistent storage 508 for execution by one or more of the respective computer processors 504 via one or more memories of memory 506. In some embodiments, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of distributed computer processing environment 100, computing device 110, and servers 120, 130, and 140. In these examples, communications unit 510 includes one or more network interface cards. Communications unit 510 may provide communications through the use of either or both physical and wireless communications links. Bookmark environment program 400 may be downloaded to persistent storage 508 through communications unit 510.

I/O interface(s) 512 allows for input and output of data with other devices that may be connected to computer system 500. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., bookmark environment program 400 can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for organizing bookmarks of a browser, based on an environment in which the bookmarks of the browser are used, the computer program product comprising:
   one or more computer readable storage media and program instructions stored on the one or more computer readable storage media, the program instructions comprising:
      program instructions to determine a first request to save content displayed within a browser as a bookmark associated with a label of a first bookmark;
      program instructions to generate a properties form for the label of the first bookmark, wherein the properties form includes a bookmark label field, and one or more environment fields, each of the one or more environment fields accepting an entry of a uniform resource locator;
      program instructions to determine from the first request for a bookmark associated with the label of the first bookmark, a first uniform resource locator associated with a first environment, both of which are associated with the label of the first bookmark;
      program instructions to populate the properties form by adding the label of the first bookmark to the bookmark label field and adding the first uniform resource locator to a first environment field of the one or more environment fields;
      program instructions to determine a second request to save content displayed within a browser as a bookmark associated with the label of the first bookmark, including a second uniform resource locator associated with a second environment, both of which are associated with the label of the first bookmark;
      program instructions to add the second uniform resource locator to the second environment field of the one or more environment fields of the properties form, associated with the label of the first bookmark, and wherein the first uniform resource locator is distinct from the second uniform resource locator;
      program instructions to store information to access content associated with the label of the first bookmark in the properties form the first uniform resource locator that is used to access content associated with the label of the first bookmark from the first environment, and the second uniform resource locator that is used to access content associated with the label of the first bookmark from the second environment, wherein the first uniform resource locator associated with the first environment and the second uniform resource locator associated with the second environment, each include a context root, such that each of the first uniform resource locator and the second uniform resource locator includes a distinct domain concatenated with a same context root for both the first uniform resource locator and the second uniform resource locator;
   in response to receiving a request to select a bookmark, program instructions to dynamically determine an environment corresponding to a domain of an active web page of a browser, and present a set of labels of bookmarks that are associated with the environment corresponding to the domain of the active web page of the browser; and
   in response to determining a change from the first environment to the second environment, based on detecting a change of a domain of the active web page of the browser, wherein the change of the domain of the active web page of the browser corresponds to the second environment, program instructions to generate a second set of uniform resource locators automatically, based on concatenating the domain of the second environment and at least one context root of at least one uniform resource locator of the first set of uniform resource locators, wherein the second set of uniform resource locators are associated with the second environment.

* * * * *